Patented Nov. 16, 1948

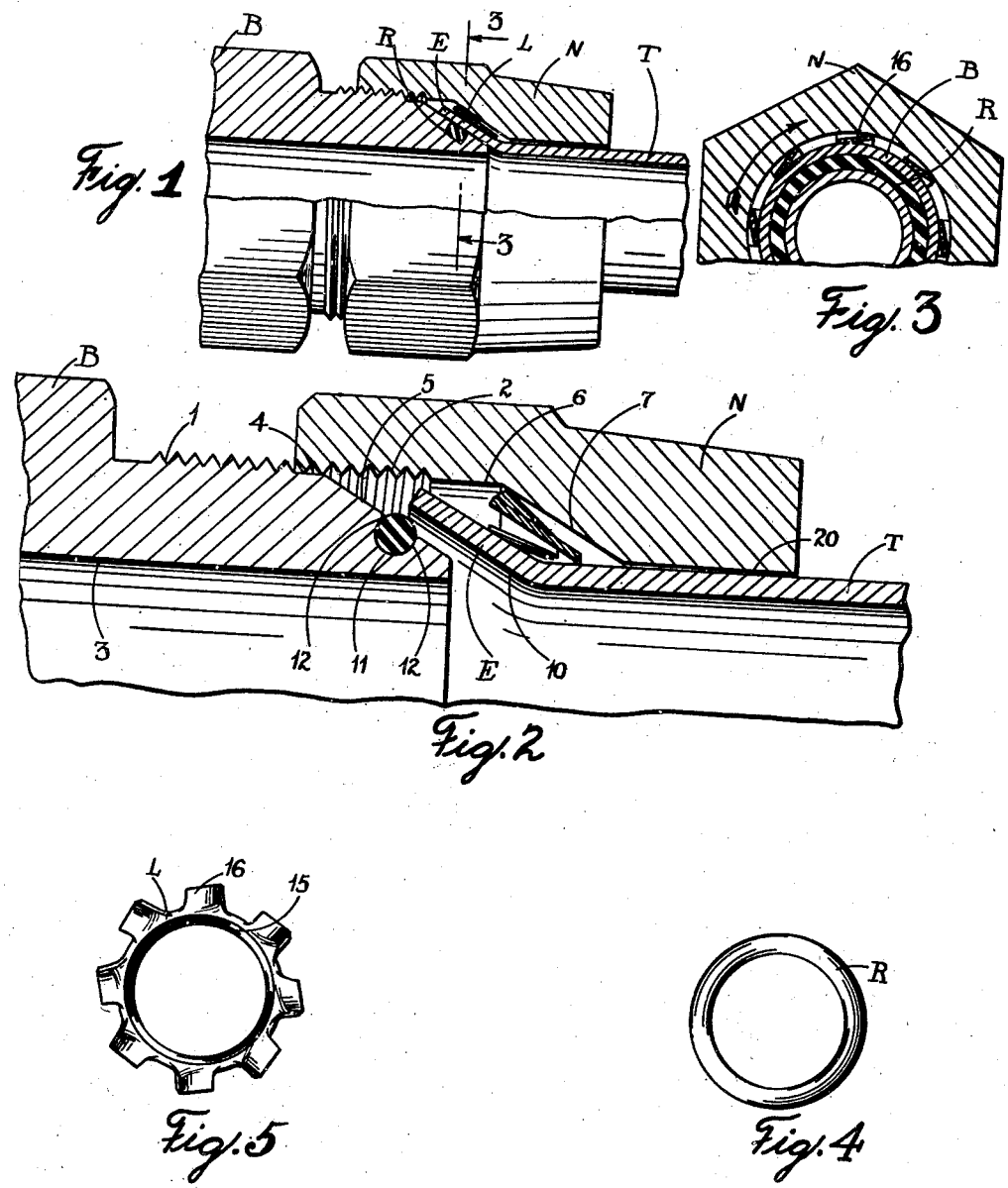

2,453,813

UNITED STATES PATENT OFFICE 2,453,813

COUPLING

Warren V. Prince, Euclid, Ohio, assignor to The Weatherhead Company, Cleveland, Ohio, a corporation of Ohio Application October 22, 1945, Serial No. 623,709

2 Claims. (Cl. 285—86)

This invention relates to pipe or tube couplings or fittings and more particularly those of the flared tube type under which sealing of the joint is effected with low wrench or finger torque.

It is among the objects of my invention to provide a fitting of the so-called low pressure type, that is one intended to resist leakage at pressures roughly at or below 100 pounds per square inch, in which the effort of making the joint is very small and can be accomplished with the fingers of the human hand rather than with the relatively high torque ordinarily required through the use of appropriate wrenches as is common in the art. Another object of my invention is to provide a tube coupling having the above characteristics which is highly resistant to the effects of vibration in regard to leakage or in regard to loosening of the joint. Another object of my invention is to provide a tube or pipe coupling which will be substantially leak proof within the range of pressures for which it is designed and which may be very quickly and easily assembled and disassembled. A further object of my invention is to provide a coupling of the low torque type in which the sealing parts may be readily replaced and renewed if the same become worn under conditions of use. Further objects of my invention is to provide a coupling of the flared tube type in which the tube is resiliently gripped both through spring-like mechanical means and cushion sealing means whereby to insure a tight seal and to inhibit the stresses of vibration from injuring the tube especially at the flared end thereof. Another object of my invention is to provide a coupling in which the cushion grip at the flared end of the tube is provided through which to resist fracture or injury to the tube at the point where it is held or engaged within the coupling.

Other objects of my invention will appear from the following description of a preferred embodiment thereof in the following specification reference being had to the accompanying drawings in which Fig. 1 is a partial longitudinal section and elevation of the parts of a preferred form of my coupling in the assembled relation; Fig. 2 is an enlarged view of the section portion of the parts contained in Fig. 1 with the parts shown in the position prior to assembly; Fig. 3 is a view of a cross-section represented as cut by a plane 3—3; Fig. 4 is an end view of the lock washer part of my coupling assembly, and Fig. 5 is an elevation of the sealing ring part of the assembly of my coupling.

In the drawings I have illustrated my invention in the environment of the male connector or body member B associated with the female nut N between the inclined faces of which the flared end E of a tube T is engaged. The body member B is provided with external threads 1 engageable with internal threads 2 of the nut N whereby the parts are drawn together longitudinally, compare Figures 1 and 2, when the assembly is made. The body member B has an internal bore 3 preferably corresponding in diameter and contour to the internal bore of the tube T. The body member B preferably has the external configuration forwardly of the threads similar to that found in the usual S. A. E. type of coupling with a smooth cylindrical external surface at 4 extending to a conical exterior surface 5, see Figure 2. Ordinarily the inclination of the conical surface is about 30° as is standard practice in the S. A. E. fittings. The nut N rearwardly of the threads 2 may have a smooth interior cylindrical surface 6 which terminates in a conical surface 7 complimentary to the conical surface 5 of the male body member B.

The flared end of the tube E is formed in the usual way to have an internal conical surface 10 substantially corresponding in shape to the external surface 5 against which it is juxtaposed as shown in Figure 2, preliminary to the assembly and completion of the joint. The tube nut N as heretofore described will be recognized as being of conventional form and arrangement and may be so taken as environmental to the instant invention.

Peculiar and novel to my invention is the provision of the channeled groove 11 cut into the conical face 5 of the body B. The groove 11 is annular with its axis such as to be equally disposed throughout the surface of the conical face 5 all the way around that surface with the side walls 12 of the channel 10 preferably extending normally or at right angles to the conical surface 5. The channel 11 is preferably of a little greater dimension between the walls 12 than it is from the base of the channel up to the surface 5, that is the channel has a little greater width than depth. Generally speaking the channel or groove 11 is disposed about midway of that portion of the surface 5 which is overlapped by the conical surface 10 of the flared end of the tube when the parts are brought to sealing relation.

To effect the fluid seal of the joint I provide a packing ring R, see also Figure 4, which is preferably of round cross section and is made of rubber or rubber-like material or synthetic rubber preferably of a durometer hardness of about 40 to 50 whereby it yields easily to compression pressures as far as modest changes in its cross sectional shape is concerned and whereby it may be distretched circumferentially whereby to be disposed within the channel without substantial impairment of the effectiveness of the ring in the sealing element. When the ring R is disposed in the channel, the ring being substantially circular in cross section, the ring will rest on the base of the channel and at the same time will stand substantially exposed above the conical surface 6 of the nose of the body member B.

The ring R being thus disposed in the channel and standing above the surface 5 it will be seen that, as the flared end E of the tube T is moved leftwardly as viewed in Figure 2, and moved from the position of Figure 2 to the position of Figure 1, the flared end of the tube will contact the exposed surface of the ring R tending to flatten the ring R down into the channel 11 so as to fill it. Flattening of the ring R and the compression thereof into the groove or channel 11 is limited when the inner face of the flared end of the tube contacts or substantially contacts the conical surface 5 of the juxtaposed face of the body member B. I have in mind that, in the forming of the flared end of the tube T with the ordinary tools that are commonly provided for such purposes, the forward and inner face 10 of the flared end of the tube is seldom truly conical and more particularly is seldom as truly conical as the machined surface 5 of the body B, therefore in the ordinary assembly of such joints of the prior art construction it has been necessary to exert enough force between the threaded elements to iron out the irregularities between the surface of the flared end of the tube and the surface against which sealing contact is required, i. e., the surface 5 of the body B or the equivalent thereof. In the practice of my invention the irregularities of the surface 10 of the flared end of the tube are compensated for by the elasticity and yielding nature of the packing ring R which will have established a sealing contact with all of the surface 10 of the flared end E with a very light pressure or relatively light longitudinal pressure and will make compensation for the ordinary and inherent irregularities in the face of the surface 10 of the tube end E. In this way when I refer to substantial contact between the flared end of the tube and the conical surface 5 I have in mind that such contact may literally be no more than perhaps mere point contact between the "high" points of the surface 10 of the tube end E and the most proximate point of the convex conical surface 5. When contact between the flared end E and the surface 5 is first made the ring R will be compressed the greatest amount but the inherent elasticity and resiliency of the ring R provides sealing contact with all portions of the flared end of the tube whether or not the metal contact between the parts is relatively close or remote.

Disposed rearwardly of the flared end of the tube and exteriorly thereof and forwardly of the female conical surface 7 of the nut N and interiorly thereof I provide a yielding lock washer L, see also Figure 3, through which the coupling pressure exerted through the nut N is yieldingly and resiliently transmitted to the rearward face of the flared end of the tube. Preferably the washer L, see also Figure 3, has a conically formed ring-like base 15 and a plurality of fingers 16 each of which is twisted to a somewhat spiral or helical form whereby to engage the rearward face of the flared end of the tube on limited points or areas whilst oppositely and relatively twisted points or areas are engaged by the concave surface 7 of the nut. In this way the pressure from the surface 7 to the flared end of the tube is not transmitted directly but is transmitted through the spring of each of the fingers 16 which are each tended to be straightened from their twisted form to a true conical surface as the parts are urged together under the influence of the threads 1 and 2 as the nut N is turned.

The lock washer L preferably has a free fit on the external wall of the tube T so that it tends to be self-centering when it is squeezed between the surface 7 of the nut and the rearward face of the flared end of the tube. In this way the compressive load tends to be evenly distributed throughout the whole annular surface of the rearward face of the flared end of the tube. While this distribution of load is effected on one side of the flared end of the tube through the washer L, a similar uniform distribution of load is effected on the other face of the flared end of the tube since the tube may have bodily movement transverse of its axis and transverse of the axis of the body B as it is supported upon and comes in contact with the sealing ring R. To facilitate this self-centering arrangement of the tube with respect to the conical surface 5 and the body B as well as the self-centering of the washer L with respect to the external surface of the flared end of the tube, the bore 20 of the nut N is large enough to clear the external surface of the tube T a distance commensurate with the errors in manufacture and the tolerances as to which the self-centering movement of the tube is intended to compensate.

The washer L, as viewed in Figure 3, is disposed in the assembly so that the surface 7 will move in a clockwise direction as viewed in Figure 3, whilst the flare end of the tube will have a relatively counter clockwise movement with respect to the twisted fingers 16 of the washer. In this way the fingers will yield whilst the nut N is being advanced upon the threads 1 of the body B assuming the threads to be right hand threads so that the fingers 16 are untwisted, i. e., are moved from their twisted condition to their relative flattened condition while their opposite edges bear respectively on the surface 7 and the outer surface of the flared end of the tube. The inherent resiliency of the twisted fingers tends to resist backward movement of the nut off the threads of the body B whereby to serve the locking function for which the lock washer is provided. At the same time the twisted fingers short of being twisted all the way into a true conical situation, which would not be the case under mere finger pressure applied to the nut, afford a yielding contact between the nut and the back end of the flare of the tube.

To this end the lock washer may be made of steel properly tempered to provide desired resilient resistance to twisting of the fingers 16 or may be made of appropriate berillium copper or other resilient material and the thickness of the washer in its function of controlling the resistance of the finger 16 may be gaged to give the desired yielding and desired resistance to yielding commensurate with the low torque operation which I desire to have in this form of my invention. Preferably I desire that the resistance to the "untwisting" of the fingers 16 of the lock washer L be such that the fingers will have edge contact with the surface 7 and back face of the flared end of the tube and will not be wholly flattened within the finger pressures or finger torque which I desire to be applied to the parts to effect the joint. Similarly the size and relative hardness of the ring R is such that it is substantially flattened when subjected to the pressures through the nut N and the lock washer L which will be short of those pressures which would collapse or wholly flatten the lock washer L. By this balance of the resistance of the washer in respect to the resistance of the ring, I obtain a yielding support for the front as well as the rear face of the flared end of the tube, the yielding support from the washer L serving the additional function of locking the nut against becoming unloosened or backing off the threads of the body.

Ordinarily the tube is held against bodily rotation which would otherwise permit undesirable loosening of the nut from the body by the bodily disposition of the tube in respect to other associated parts. Additionally the face 10 of the flared end of the tube E in its bearing on the rubber or rubber-like material of the ring R has a high coefficient friction which of itself resists relative rotation of the end of the tube with respect to the body B even when the groove is not otherwise held against rotation by its external connections or disposition in relation to other parts to which it is joined.

From the foregoing it will be seen that I have provided a coupling of very simple construction which will be highly resistant to the adverse influences and effects of vibration, which can be assembled with a very light torque and which in relation to the degree of torque required to effect the assembly will resist relatively high fluid pressures and will be readily attachable and detachable with no more than finger effort and of great service in the many instances where quick attachment and detachment under such circumstances is required and is of great advantage.

While I have illustrated and described a preferred form of my invention, changes, modifications and improvements will occur to those skilled in the art upon their practice and understanding of the precepts and teachings hereof, and I do not care to be limited in the scope of my patent to the preferred or particular forms herein illustrated and described or in any manner other than by the claims appended hereto.

I claim:

1. A coupling for a tube having a substantially conically formed flared end comprising coupling members in threaded engagement having respectively parts with annular convex and concave substantially conical surfaces adapted to be juxtaposed to complementary surfaces of the flared end of the tube, the part with the convex surface having an annular groove facing and adapted to enter the flared end of the tube, a yieldable packing ring of substantially circular cross-section disposed in said groove having a greater idle diameter than the depth of said groove whereby to have a surface tending to stand above said convex surface, a conically formed resilient washer loosely fitting the exterior of the tube adjacent the flared end thereof and aligned therewith between the flared end of the tube and the said concave surface of one of said coupling members, said washer having circumferentially spaced resilient portions engaged by the flared tube end at certain zones and by the concave coupling member at zones circumferentially spaced therefrom so that the washer may be resiliently stressed between the flared end of the tube and said concave surface, the flared end of the tube having fluid sealing contact with said ring on its inwardly disposed face and having resilient supporting engagement with said washer on its opposite face when said members are screwed together, said washer not only resiliently pressing the flared end of the tube against said sealing ring but also inhibiting rotation between the tube and the member having contact with said washer.

2. A coupling for a tube having a substantially conically formed flared end comprising coupling members in threaded engagement having respectively parts with convex and concave substantially conical surfaces adapted to be juxtaposed to complementary surfaces of the flared end of the tube, the part with the convex surface having a right angled groove of greater width than depth facing and adapted to enter the flared end of the tube, a yieldable packing ring of substantially circular cross-section disposed in said groove having a greater idle diameter than the depth of said groove whereby to have a surface tending to stand above said convex surface, the cross-sectional area of said ring being substantially equal to the cross-sectional area of said groove, a conically formed resilient washer loosely fitting the exterior of the tube adjacent the flared end thereof and aligned therewith between the flared end of the tube and the said concave surface of one of said coupling members, said washer having circumferentially spaced twisted resilient portions with oppositely offset sharp edges oppositely engaged and resiliently stressed between the flared end of the tube and said concave surface, the flared end of the tube having fluid sealing contact with said ring on its inwardly disposed face and resilient supporting engagement with said washer on its opposite face when said members are screwed together, the said edges of said washer inhibiting rotation between the tube and the member having contact with said washer in the direction of unscrewing said members.

WARREN V. PRINCE.

REFERENCES CITED

The following references are of record in the file of this patent:

UNITED STATES PATENTS

| Number | Name | Date |
| --- | --- | --- |
| Re. 19,116 | Olson | Mar. 13, 1934 |
| 1,604,122 | Hosking | Oct. 26, 1926 |
| 2,323,099 | Patten | June 29, 1943 |
| 2,381,829 | Livers | Aug. 7, 1945 |
| 2,390,103 | Johnson | Dec. 4, 1945 |